United States Patent
Xue et al.

(10) Patent No.: US 11,432,273 B2
(45) Date of Patent: Aug. 30, 2022

(54) CONTROL INFORMATION SENDING METHOD, CONTROL INFORMATION RECEIVING METHOD, ACCESS NETWORK DEVICE, AND TERMINAL DEVICE

(71) Applicant: HUAWEI TECHNOLOGIES CO., LTD., Guangdong (CN)

(72) Inventors: Lixia Xue, Beijing (CN); Hao Sun, Beijing (CN); Bingyu Qu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 489 days.

(21) Appl. No.: 16/530,657

(22) Filed: Aug. 2, 2019

(65) Prior Publication Data

US 2019/0357189 A1 Nov. 21, 2019

Related U.S. Application Data

(63) Continuation of application No. PCT/CN2018/074789, filed on Jan. 31, 2018.

(30) Foreign Application Priority Data

Feb. 4, 2017 (CN) .......................... 201710064645.5

(51) Int. Cl.
  *H04W 72/04* (2009.01)
  *H04L 1/00* (2006.01)
  *H04W 8/24* (2009.01)

(52) U.S. Cl.
  CPC ......... *H04W 72/042* (2013.01); *H04L 1/0038* (2013.01); *H04W 8/24* (2013.01); *H04W 72/0446* (2013.01)

(58) Field of Classification Search
  CPC ... H04L 1/0038; H04L 5/0007; H04L 5/0053; H04L 5/0094; H04W 72/0406; H04W 72/042; H04W 72/0446; H04W 8/24
  See application file for complete search history.

(56) References Cited

U.S. PATENT DOCUMENTS

2011/0103509 A1* 5/2011 Chen .................... H04L 5/0007
  375/295
2011/0194501 A1* 8/2011 Chung .................. H04L 5/0053
  370/328

(Continued)

FOREIGN PATENT DOCUMENTS

CN  101790190 A  7/2010
CN  102611524 A  7/2012

(Continued)

OTHER PUBLICATIONS

ZTE ZTE Microelectronics: "Discussion on sPDCCH for sTTI", 3GPP Draft; R1-1611469 Discussion on sPDCCH for sTTI, 3rd Generation Partnership Project (3GPP), vol. RAN WG1, No. Reno, USA; Nov. 14, 2016-Nov. 18, 2016 Nov. 13, 2016, XP051175448, total 7 pages.

(Continued)

*Primary Examiner* — Dung B Huynh
(74) *Attorney, Agent, or Firm* — Womble Bond Dickinson (US) LLP

(57) ABSTRACT

Embodiments of the present disclosure provide control information sending methods, control information receiving methods, and devices. The sending method may include determining, by an access network device, a control channel candidate set corresponding to a terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device. The sending method may further includes sending, by the access network device, control information (Continued)

to the terminal device by using at least one control channel candidate in the control channel candidate set. The control information sending method of the embodiments of the present invention can satisfy requirements of new generation radio communications systems.

17 Claims, 11 Drawing Sheets

(56) References Cited

U.S. PATENT DOCUMENTS

| | | | |
|---|---|---|---|
| 2011/0310856 A1* | 12/2011 | Hariharan | H04L 5/14 370/336 |
| 2013/0194931 A1* | 8/2013 | Lee | H04W 72/04 370/241 |
| 2014/0064215 A1* | 3/2014 | Wu | H04L 5/0053 370/329 |
| 2014/0071915 A1 | 3/2014 | Papasakellariou et al. | |
| 2014/0092836 A1* | 4/2014 | Park | H04W 72/042 370/329 |
| 2014/0098775 A1* | 4/2014 | Horiuchi | H04W 72/042 370/329 |
| 2014/0233470 A1* | 8/2014 | Kim | H04L 5/0053 370/329 |
| 2014/0301341 A1* | 10/2014 | Pan | H04L 1/0026 370/329 |
| 2014/0348125 A1 | 11/2014 | Zhao et al. | |
| 2015/0023290 A1* | 1/2015 | Tang | H04W 72/042 370/329 |
| 2015/0029953 A1* | 1/2015 | Chen | H04W 72/042 370/329 |
| 2015/0078277 A1* | 3/2015 | Seo | H04W 72/042 370/329 |
| 2015/0117354 A1* | 4/2015 | Dai | H04L 5/0053 370/329 |
| 2015/0131591 A1* | 5/2015 | Liu | H04L 5/00 370/329 |
| 2015/0195821 A1* | 7/2015 | Li | H04L 5/0053 370/329 |
| 2015/0201405 A1* | 7/2015 | Liu | H04L 5/0053 370/329 |
| 2015/0257086 A1* | 9/2015 | Jiang | H04W 48/08 370/329 |
| 2016/0050687 A1* | 2/2016 | Chen | H04L 5/0091 370/329 |
| 2016/0080094 A1* | 3/2016 | Kim | H04B 15/00 455/63.1 |
| 2016/0119103 A1* | 4/2016 | Yu | H04W 76/27 370/329 |
| 2016/0269151 A1* | 9/2016 | Maeda | H04W 72/042 |
| 2017/0005756 A1* | 1/2017 | Suda | H04L 1/0009 |
| 2017/0019237 A1 | 1/2017 | Yang et al. | |
| 2017/0033901 A1* | 2/2017 | Tavildar | H04L 5/001 |
| 2017/0163365 A1* | 6/2017 | Ohwatari | H04L 5/0053 |
| 2017/0208552 A1* | 7/2017 | Ohwatari | H04J 11/004 |
| 2017/0230951 A1* | 8/2017 | Xiong | H04W 48/12 |
| 2018/0007664 A1* | 1/2018 | Gho | H04W 72/042 |
| 2018/0019843 A1* | 1/2018 | Papasakellariou | H04L 1/1812 |
| 2018/0076872 A1* | 3/2018 | Li | H04L 5/0094 |
| 2018/0098307 A1* | 4/2018 | Yang | H04L 5/001 |
| 2018/0103459 A1* | 4/2018 | Liu | H04W 72/042 |
| 2018/0213530 A1* | 7/2018 | Mochizuki | H04L 5/0044 |
| 2018/0279278 A1* | 9/2018 | Pan | H04W 72/042 |
| 2019/0028234 A1* | 1/2019 | Seo | H04L 5/0053 |
| 2019/0037540 A1* | 1/2019 | Seo | H04W 72/042 |
| 2019/0103951 A1* | 4/2019 | Park | H04L 1/0061 |
| 2019/0159230 A1* | 5/2019 | Kim | H04W 72/1268 |
| 2019/0191438 A1* | 6/2019 | Kim | H04L 5/0053 |
| 2019/0349780 A1* | 11/2019 | Li | H04W 72/04 |
| 2019/0357189 A1* | 11/2019 | Xue | H04W 72/0446 |
| 2020/0015215 A1* | 1/2020 | Bagheri | H04L 41/08 |
| 2020/0280965 A1* | 9/2020 | Xiong | H04L 5/0053 |
| 2020/0305129 A1* | 9/2020 | Lee | H04L 1/1861 |
| 2021/0021974 A1* | 1/2021 | Kim | H04W 4/021 |
| 2021/0351865 A1* | 11/2021 | Ouchi | H04L 27/26 |

FOREIGN PATENT DOCUMENTS

| | | |
|---|---|---|
| CN | 103828463 A | 5/2014 |
| CN | 104185197 A | 12/2014 |
| CN | 104811263 A | 7/2015 |
| EP | 2874426 A1 | 5/2015 |
| WO | 2014008830 A1 | 1/2014 |
| WO | 2015018096 A1 | 2/2015 |
| WO | 2015147543 A1 | 10/2015 |

OTHER PUBLICATIONS

ETRI: "Discussion on control resource set and DMRS for DL control channel", 3GPP Draft; R1-1700581 Discussion on Control Resourceset and DMRS for DL Control Channel, 3rd Generationpartnership Project (3GPP), vol. RAN WG1, No. Spokane, USA; Jan. 16, 2017-Jan. 20, 2017 Jan. 10, 2017, XP051202969, total 5 pages.

* cited by examiner

| 310. An access network device determines a control channel candidate set corresponding to a terminal device |

↓

| 320. The access network device sends control information to the terminal device by using at least one control channel candidate in the control channel candidate set |

| Candidate#7 | Candidate#11 | Candidate#13 | Candidate#14 |
|---|---|---|---|
| Candidate#6 | | | |
| Candidate#5 | Candidate#10 | | |
| Candidate#4 | | | |
| Candidate#3 | Candidate#9 | Candidate#12 | |
| Candidate#2 | | | |
| Candidate#1 | Candidate#8 | | |
| Candidate#0 | | | |

FIG. 4f

| | |
|---|---|
| | ⋮ ⋮ ⋮ |
| CCE set A | m<br>m+1<br>m+2<br>m+3<br>m+4<br>m+5<br>m+6<br>m+7 |
| | ⋮ ⋮ ⋮ |
| CCE set B | m+i<br>m+i+1<br>m+i+2<br>m+i+3<br>m+i+4<br>m+i+5<br>m+i+6<br>m+i+7 |
| | ⋮ ⋮ ⋮ |
| CCE set C | m+j<br>m+j+1<br>m+j+2<br>m+j+3<br>m+j+4<br>m+j+5<br>m+j+6<br>m+j+7 |
| | ⋮ ⋮ ⋮ |

FIG. 4g

CONTROL INFORMATION SENDING METHOD, CONTROL INFORMATION RECEIVING METHOD, ACCESS NETWORK DEVICE, AND TERMINAL DEVICE

CROSS-REFERENCE TO RELATED APPLICATIONS

This application is a continuation of International Application No. PCT/CN2018/074789, filed on Jan. 31, 2018, which claims priority to Chinese Patent Application No. 201710064645.5, filed on Feb. 4, 2017. The disclosures of the aforementioned applications are hereby incorporated by reference in their entireties.

TECHNICAL FIELD

The present disclosure relates to the communications field, and in particular, to a control information sending method, a control information receiving method, an access network device, and a terminal device.

BACKGROUND

In the 5th generation (5G) radio access system standard, new radio (NR), a basic unit in frequency domain is one subcarrier, and a basic unit in time domain is one orthogonal frequency division multiplexing (OFDM) symbol. A resource element (RE) is the smallest physical resource, and includes one subcarrier in one OFDM symbol.

In 5G NR, a basic time-domain scheduling unit is a slot or a mini-slot, collectively referred to as slot herein for convenience. A slot consists of several OFDM symbols. As shown in FIG. 1, a slot may be divided into a control region and a data region, and a downlink control channel (PDCCH) carrying downlink control information (DCI) is transmitted in the control region.

In a Long-Term Evolution (LTE) system, a user-specific search space is a PDCCH candidate set for user equipment, which is used to carry user-specific downlink control information. The PDCCH candidate set includes downlink control channels of four different aggregation levels, and a starting position of a PDCCH candidate subset corresponding to each aggregation level is separately calculated. In a determined subframe, a starting position of downlink control channels of any aggregation level is determined by a user equipment (UE) identifier ID, and starting positions of downlink control channel candidate sets of different aggregation levels are not directly related.

At present, a solution for determining a PDCCH search space is proposed in discussions about 5G systems, where a downlink control region of a system includes one or more downlink control channel resource sets. In one downlink control channel resource set, PDCCH candidates of different aggregation levels are designed in a nested manner. For example, resources of a downlink control channel of a lower aggregation level are a true subset of resources of a downlink control channel of a higher aggregation level. One UE may search a plurality of downlink control channel resource sets for downlink control information. However, none of the solutions for determining a PDCCH search space can fulfill such design.

SUMMARY

Embodiments of the present invention provide a control information sending method, a control information receiving method, an access network device, and a terminal device, so as to determine a PDCCH candidate set when PDCCH candidates of different aggregation levels are designed in a nested manner.

According to a first aspect, a control information sending method is provided, including:

determining, by an access network device, a control channel candidate set corresponding to a terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device; and sending, by the access network device, control information to the terminal device by using at least one control channel candidate in the control channel candidate set.

According to a second aspect, a control information receiving method is provided, including:

determining, by a terminal device, a control channel candidate set corresponding to the terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device; and performing, by the terminal device, detection for the control channel candidate in the control channel candidate set, and receiving control information.

According to a third aspect, an access network device is provided, including:

a processor, configured to determine a control channel candidate set corresponding to a terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device; and a transceiver, configured for the access network device to send control information to the terminal device by using at least one control channel candidate in the control channel candidate set.

According to a fourth aspect, a terminal device is provided, including:

a processor, configured to determine a control channel candidate set corresponding to the terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device; and a transceiver, configured to perform detection for the control channel candidate in the control channel candidate set, and receive control information.

With the control information sending method, the control information receiving method, the access network device, and the terminal device provided in the foregoing aspects, a PDCCH candidate set can be determined when PDCCH candidates of different aggregation levels are designed in a nested manner, satisfying requirements of next generation radio communications systems.

DESCRIPTION OF DRAWINGS

FIG. 4f is a schematic structural diagram of a control channel in one implementation according to an embodiment of the present invention;

FIG. 4g is a schematic structural diagram of a control channel in one implementation according to an embodiment of the present invention;

DESCRIPTION OF EMBODIMENTS

Figure 1:
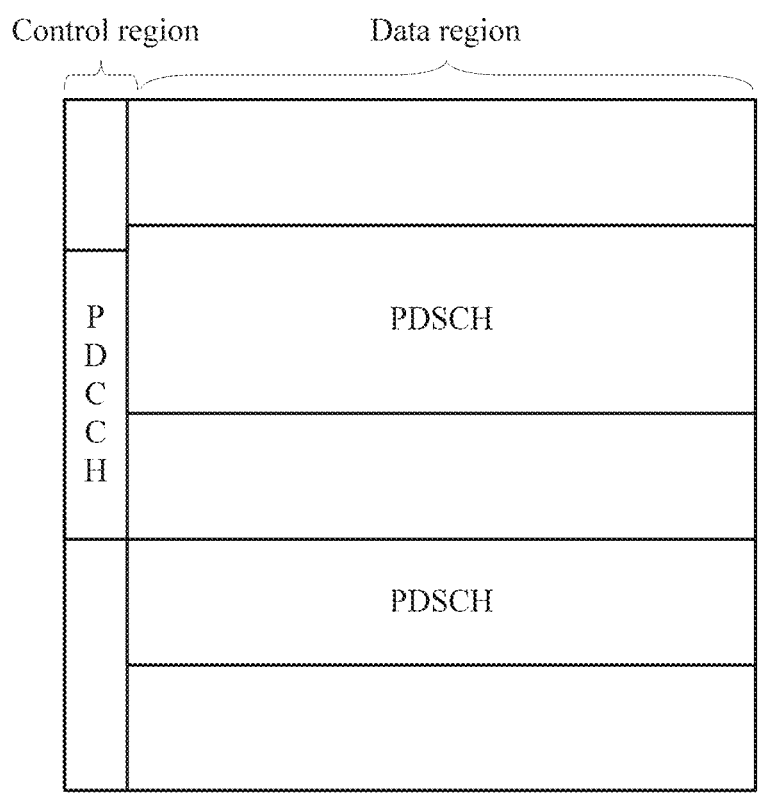
FIG. 1 is a schematic structural diagram of a slot.

The following describes the technical solutions in the embodiments of the present invention with reference to the accompanying drawings in the embodiments of the present invention.

It should be understood that the technical solutions in the embodiments of the present invention may be applied to various communications systems, for example, wireless fidelity (Wi-Fi), worldwide interoperability for microwave access (WiMAX), a global system for mobile communications (GSM), a code division multiple access (CDMA) system, a general packet radio service (GPRS), a long term evolution (LTE) system, a long term evolution advanced (LTE-A) system, a universal mobile telecommunications system (UMTS), a 5G system, and cellular systems related to the 3rd generation partnership project (3GPP). This is not limited in the embodiments of the present invention. However, for ease of description, an LTE network is used as an example for description in the embodiments of the present invention.

The embodiments of the present invention may be used in radio networks of different standards. Access network devices may be different physical devices in different systems. For example, access network devices in LTE and LTE-A include evolved NodeBs (eNB), and access network devices in wideband code division multiple access (WCDMA) include radio network controllers (RNC) and/or NodeBs. Similarly, other radio networks such as WiMax may also use solutions similar to those of the embodiments of the present invention.

It should also be understood that in the embodiments of the present invention, a terminal device may be referred to as user equipment (UE), a mobile station (MS), a mobile terminal, or the like. The terminal may communicate with one or more core networks through a radio access network (RAN). For example, the terminal may be a mobile phone (or referred to as a "cellular" phone), or a computer provided with a communication function. For example, the terminal may be a portable, pocket-sized, handheld, computer built-in, or vehicle-mounted mobile apparatus.

The method and the apparatus provided in the embodiments of the present invention may be applied to a terminal device or a network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing by using processes (process), for example, a Linux operating system, a Unix operating system, an Android operating system, an iOS operating system, or a Windows operating system. The application layer includes applications such as a browser, an address book, word processing software, and instant messaging software. In addition, in the embodiments of the present invention, a specific structure of an execution body of a signal transmission/reception method is not particularly limited in the embodiments of the present invention, provided that communication can be implemented based on the signal transmission/reception method in the embodiments of the present invention by running a program that records code for the signal transmission/reception method in the embodiments of the present invention. For example, the execution body of the wireless communication method in the embodiments of the present invention may be a terminal device or a network device, or a function module, in a terminal device or a network device, that is capable of invoking and executing a program.

In addition, aspects or features in the embodiments of the present invention may be implemented as a method, an apparatus or an artifact that uses standard programming and/or engineering technologies. The term "artifact" used in this application covers computer programs that can be accessed from any computer readable device, carrier or medium. For example, the computer-readable medium may include but is not limited to: a magnetic storage component (for example, a hard disk, a floppy disk or a magnetic tape), an optical disc (for example, a compact disc (CD), or a digital versatile disc (DVD)), a smart card, and a flash memory device (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to radio channels, and various other media that can store, contain, and/or carry instructions and/or data.

It should be understood that, the term "and/or" in the embodiments of the present invention describes only an association relationship for describing associated objects and represents that three relationships may exist. For example, A and/or B may represent the following cases: Only A exists, both A and B exist, and only B exists. In addition, the character "/" in this specification generally indicates an "or" relationship between the associated objects. Terms "first" and "second" in the embodiments of the present invention are used only for distinguishing, and do not convey any meaning of order or magnitude.

Figures 2, 3A:
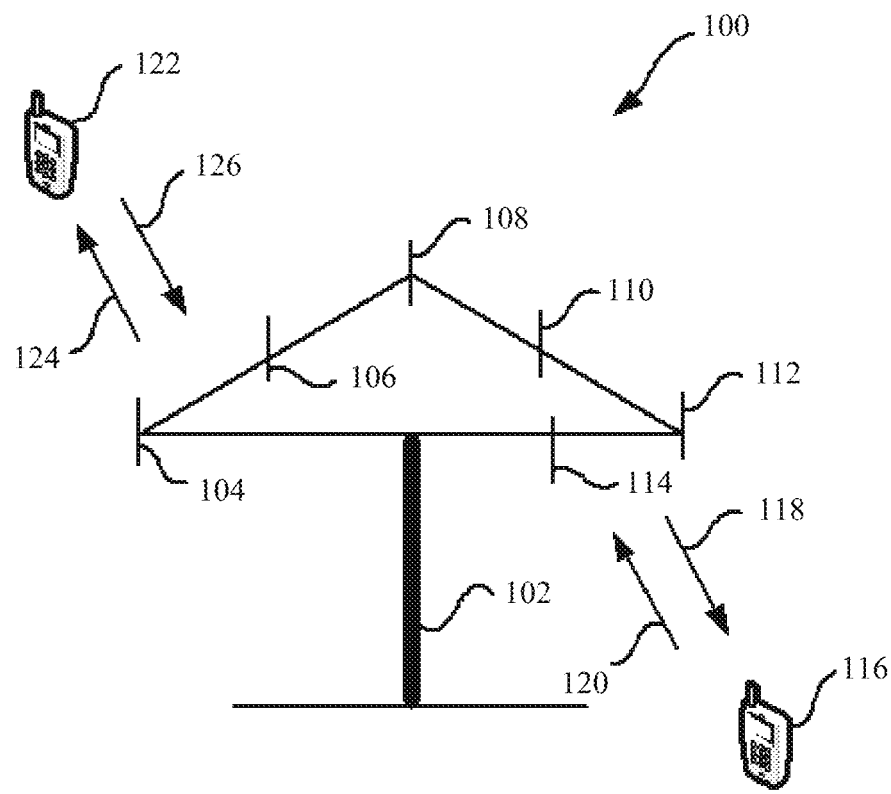
FIG. 2 is a schematic diagram of a radio communications system to which embodiments of the present invention are applied.
FIG. 3a is a schematic flowchart of a control information sending method according to an embodiment of the present invention.

FIG. 2 is a schematic diagram of a radio communications system to which the embodiments of the present invention are applied. As shown in FIG. 2, the radio communications system 100 includes an access network device 102. The access network device 102 may include one antenna or a plurality of antennas, for example, antennas 104, 106, 108, 110, 112, and 114. In addition, the access network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, and an antenna) related to signal transmission and reception. The network device 102 may communicate with a plurality of terminal devices (for example, a terminal device 116 and a terminal device 122). However, it can be understood that the network device 102 may communicate with any quantity of terminal devices similar to the terminal device 116 or the terminal device 122.

As shown in FIG. 2, the terminal device 116 communicates with the antennas 112 and 114. The antennas 112 and 114 send information to the terminal device 116 through a forward link (also referred to as a downlink) 118, and receive information from the terminal device 116 through a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

FIG. 3a is a schematic flowchart of a control information sending method 300 according to an embodiment of the present invention. As shown in FIG. 3a, the method 300 includes the following steps.

310: An access network device determines a control channel candidate set (control channel candidate set) corresponding to a terminal device.

The control channel candidate set includes at least one control channel candidate, the at least one control channel candidate includes at least one control channel element (CCE), the control channel candidate set is contained in at least one control channel element set (CCE set), a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device.

320: The access network device sends control information to the terminal device by using at least one control channel candidate in the control channel candidate set.

Figure 4A:
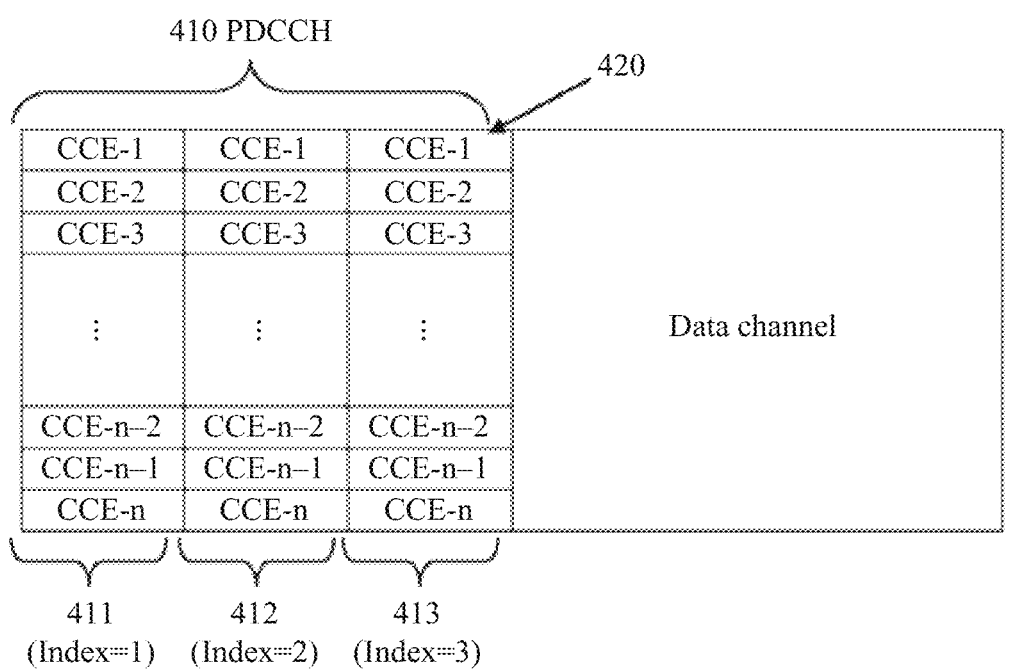
FIG. 4a is a schematic structural diagram of a control channel in one implementation according to an embodiment of the present invention.

Further, FIG. 4a is a schematic structural diagram of a control channel in one implementation of this embodiment of the present invention. A downlink control channel 410 on a downlink between an access network device 102 and a terminal device 116 includes a plurality of control channel elements 420. Each CCE 420 has an index. For example, an index of CCE-1 is 1, and an index of CCE-2 is 2. The plurality of CCEs 420 may be the same in size. To be specific, they occupy a same quantity of time-frequency resources. In consideration that occupation of time-frequency resources by the CCE 420 is not limited to one manner, the CCE 420 in this embodiment of the present invention may be a logical unit, and the CCE 420 is mapped to real time-frequency resources through resource mapping. For example, the CCE 420 may be mapped to time-frequency resources in a localized or distributed manner, or all or some resource elements occupied by the CCE 420 are mapped to time-frequency resources first in time domain and then in frequency domain, or all or some resource elements occupied by the CCE 420 are mapped to time-frequency resources first in frequency domain and then in time domain.

In an optional control channel structure, a control channel may be divided into one or more control channel regions. If the control channel is divided into one control channel region, control channel elements CCEs may be numbered uniformly in the entire region. If the control channel is divided into a plurality of control channel regions, control channel elements CCEs may be numbered separately in each control channel region, or a plurality of control channel regions are numbered jointly. A specific method for division into a plurality of control channel regions may be that different time domain symbols correspond to different control channel regions, or that the first two symbols correspond to one control channel region and the third symbol corresponds to another control channel region; or may be that different frequency domain regions correspond to different control channel regions, or that time and frequency domains jointly form different control channel regions. As shown in FIG. 4a, the control channel 410 may be divided into a plurality of control channel regions, for example, control channel regions 411 to 413, on different time domain symbols. Accordingly, the control channel 410 includes a plurality of control channel resource sets 431 to 433 corresponding to the regions 411 to 413, each control channel resource set includes a plurality of CCEs 420, and the CCEs 420 contained in the control channel resource set are located in corresponding control channel regions. Each of the control channel regions 411 to 413 may have a control channel region index. For example, indexes of the control channel regions 411 to 413 are 1 to 3, respectively.

Figure 4B:
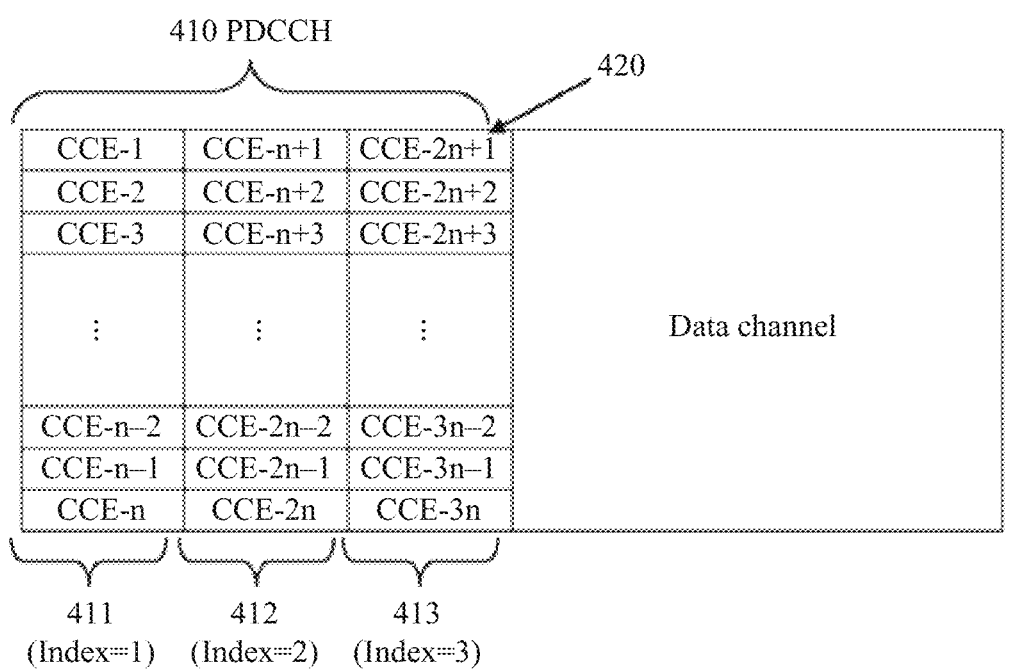
FIG. 4b is a schematic structural diagram of a control channel in one implementation according to an embodiment of the present invention.

As shown in FIG. 4a, in different control channel resource sets, CCE indexes of the CCEs 420 may be separately numbered in each control channel resource set. In another optional control channel structure, as shown in FIG. 4b, CCE indexes of the CCEs 420 may be alternatively numbered consecutively across different control channel resource sets.

Figures 4C, 4D:
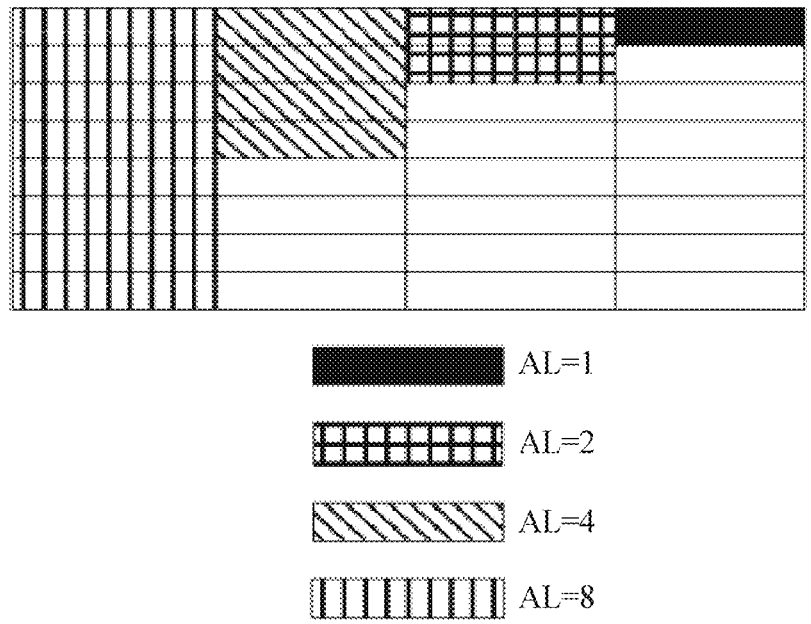
FIG. 4c is a schematic structural diagram of a control channel in one implementation according to an embodiment of the present invention.
FIG. 4d is a schematic structural diagram of a control channel in one implementation according to an embodiment of the present invention.

As shown in FIG. 4c, control channel candidates have a plurality of aggregation levels (AL). For example, the AL may be equal to 1, 2, 4, or 8. A control channel candidate of an aggregation level L includes L CCEs, where L is a positive integer, for example, 1, 2, 4, or 8. A maximum aggregation level supported by the access network device 102 is $L_{max\text{-}ran}$, for example, $L_{max\text{-}ran}=8$. A maximum aggregation level supported by the terminal device is $L_{max\text{-}ue}$, for example, $L_{max\text{-}ue}=8$. $L_{max\text{-}ran}$ and $L_{max\text{-}ue}$ may be the same or different. The maximum aggregation level supported by the terminal device is a maximum aggregation level that is allowed by a capability of the terminal device, or a maximum aggregation level configured by the access network device or the terminal device within a capability of the terminal device. Specifically, for example, the maximum aggregation level allowed by the capability of the terminal device is 8. However, because of reasons such as current channel conditions of the terminal device and current load of the access network device, the access network device or the terminal device may configure a currently supportable maximum aggregation level to be $L_{max\text{-}ue}=4$. That is, aggregation levels supported by the terminal device are AL=1, 2, and 4. It should be known that these values are all examples. A specific value range is not limited for the aggregation level in the present invention.

For each aggregation level, there may be one or more control channel candidates. To be specific, the one or more control channel candidates of each aggregation level are a search space for the terminal device for this aggregation level. Control channel candidates of all aggregation levels supported by the terminal device form a control channel candidate set, that is, a total search space for the terminal device. As shown in FIG. 4d, it is assumed that a maximum aggregation level supported by the terminal device is 8. For AL=1, a quantity of control channel candidates may be 8; for AL=2, a quantity of control channel candidates may be 4; for AL=4, a quantity of control channel candidates may be 2; and for AL=8, a quantity of control channel candidates may be 1. In other words, the terminal device needs to perform blind detection for these 15 control channel candidates. A sum (that is, a quantity of control channel candidates in the control channel candidate set) of quantities of control channel candidates of all aggregation levels supported by the terminal device should be less than or equal to a maximum quantity of blind detections allowed by the terminal device. It should be known that the foregoing quantity of control channel candidates of each aggregation level is merely an example. The present invention is not limited in this sense.

Figure 4E:
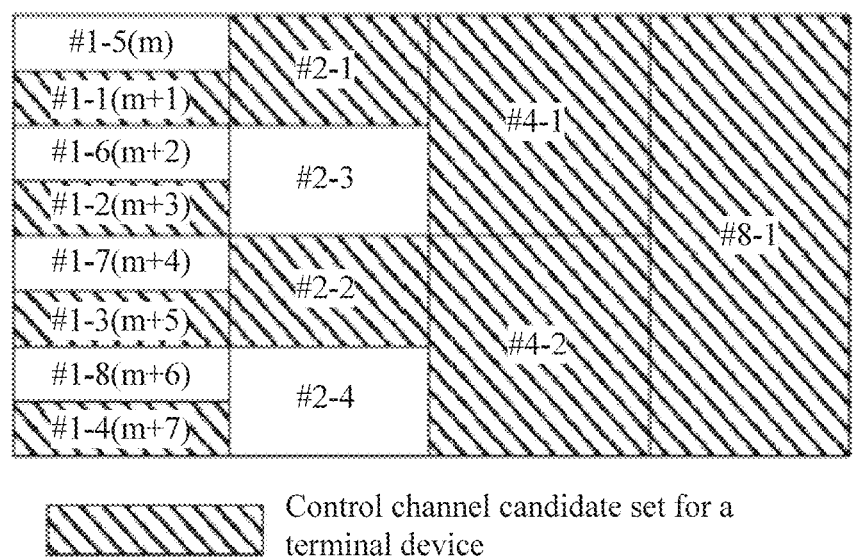
FIG. 4e is a schematic structural diagram of a control channel in one implementation according to an embodiment of the present invention.

In this embodiment of the present invention, a search space is designed in a nested manner. As shown in FIG. 4e, for example, a maximum aggregation level supported by a terminal device in this example is $L_{max\text{-}ue}8$. The terminal device has one AL=8 control channel candidate #8-1, two AL=4 control channel candidates #4-1 and #4-2, two AL=2 control channel candidates #2-1 and #2-2, and four AL=1 control channel candidates #1-1 to #1-4. If the control channel candidate #8-1 occupies CCEs m to m+7, some or all control channel candidates corresponding to at least one aggregation level within the maximum aggregation level supported by the terminal device include at least one of the CCEs m to m+7. For example, the control channel candidate #4-1 includes CCEs m to m+3, and the control channel candidate #4-2 includes CCEs m+4 to m+7. The control channel candidate #2-1 includes the CCE m and the CCE m+1, and the control channel candidate #2-2 includes the CCE m+3 and the CCE m+4. The control channel candidate #1-1 includes the CCE m+1, the control channel candidate #1-2 includes the CCE m+3, the control channel candidate #1-3 includes the CCE m+5, and the control channel candidate #1-4 includes the CCE m+7. It should be known that FIG. 4e is merely an example, and the terminal device may include different control channel candidates.

Based on the nested search space design shown in FIG. 4e, in this embodiment of the present invention, CCEs occupied by one control channel candidate with the maximum aggregation level supported by the terminal device is defined as a CCE set, and the control channel candidate set corresponding to the terminal device is contained in at least one CCE set. In an implementation shown in FIG. 4e, the control channel candidate set corresponding to the terminal device is contained in one CCE set, that is, the CCEs m to m+7. The control channel candidates in the control channel element set that belong to the control channel candidate set have at least two aggregation levels, or have all aggregation levels within the maximum aggregation level supported by the terminal device. Optionally, a quantity of CCEs contained in one control channel candidate set element may be a positive integer multiple of a quantity of CCEs occupied by one control channel candidate of the maximum aggregation level supported by the terminal device.

Figure 4F:
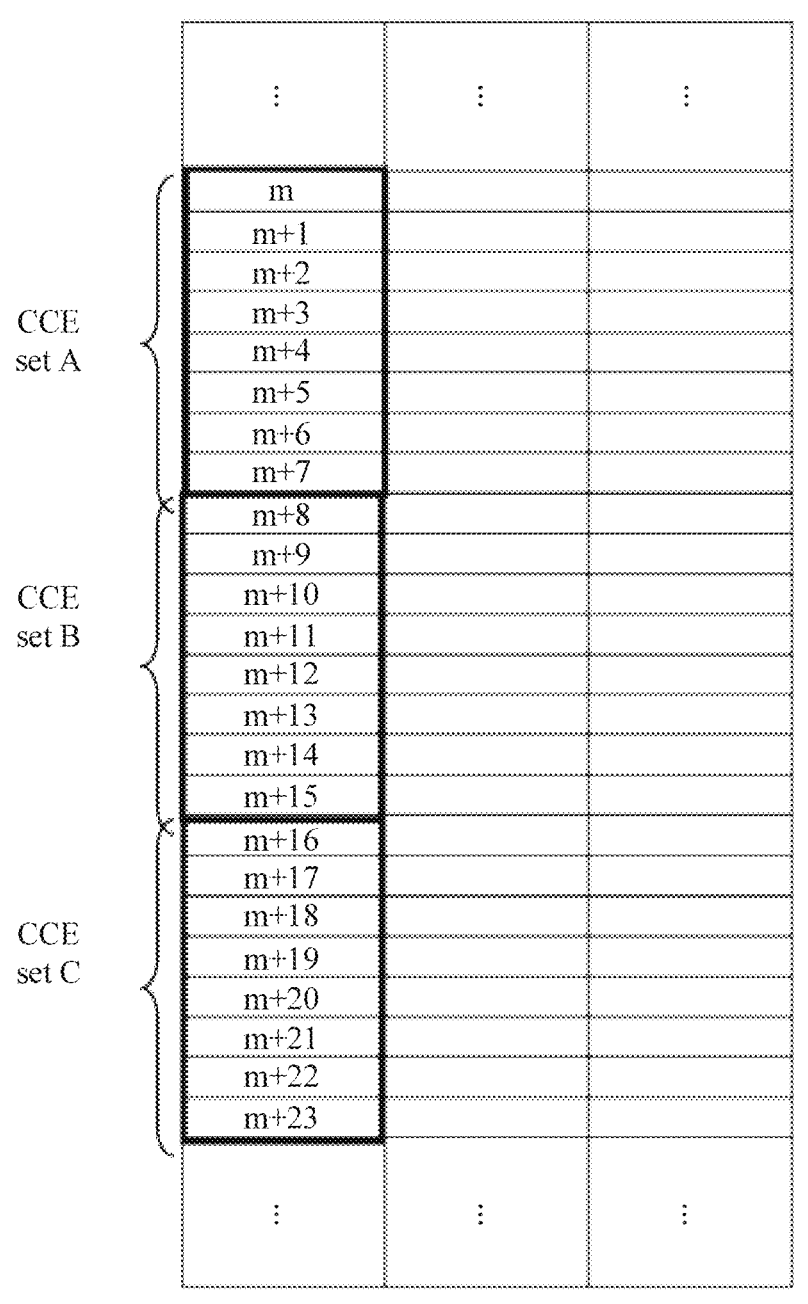

In other implementations shown in FIG. 4f and FIG. 4g, the control channel candidate set corresponding to the terminal device is contained in a plurality of CCE sets. To be specific, a quantity of control channel candidates corresponding to a maximum aggregation level (for example, $L_{max\text{-}ue}=8$) supported by the terminal device is 3, and the control channel candidate set for the terminal device is contained in three CCE sets. As shown in FIG. 4f, the three CCE sets may include consecutive CCEs. For example, a CCE set A occupies CCEs m to m+7, a CCE set B occupies CCEs m+8 to m+15, and a CCE set C occupies CCEs m+16 to m+23. To be specific, a starting CCE position of the first CCE set A may be determined first, and then specific CCEs contained in each CCE set are determined based on quantities of CCEs contained in the CCE sets A, B, and C. As shown in FIG. 4g, CCEs contained in the three CCE sets are determined separately, and a starting CCE position of each CCE set may be determined separately, for example, based on an index of a control channel region to which the CCE set belongs. For example, the CCE set A occupies the CCEs m to CCE m+7, the CCE set B occupies CCEs m+i to m+i+7, and the CCE set C occupies CCEs m+j to m+j+7, where m is a natural number or a positive integer, and i and j are different positive integers. In addition, CCEs contained in the three CCE sets may be alternatively non-consecutive. To be specific, the starting CCE position of the first CCE set A may be determined first, and then CCE positions of the CCE sets B and C are determined based on starting CCE relationships between the CCE sets A, B, and C, and/or quantities of CCEs contained in the CCE sets A, B, and C or offsets of starting CCE positions of the CCE sets B and C from that of the set A. Control channel candidates contained in each CCE set that belong to the control channel candidate set corresponding to the terminal device are similar to those in FIG. 4e. Details are not described herein again.

Optionally, when the control channel candidate set corresponding to the terminal device is contained in a plurality of CCE sets, distribution of the plurality of CCE sets may include: The plurality of CCE sets may belong to one control channel resource set, or the plurality of CCE sets may belong to different control channel resource sets. Specifically, each CCE set and the control channel resource set should be in a definite correspondence that is predefined or configured by a system for the terminal device.

No matter whether one or more CCE sets in which the control channel candidate set corresponding to the terminal device is contained belong to one control channel resource set or different control channel resource sets, the one or more CCE sets may be mapped to same or different time-frequency resources. When the terminal device is notified of a potential time-frequency resource corresponding to a control channel of the terminal device, the terminal device may determine all control channel candidate sets for the terminal device based on the one or more CCE sets in which the control channel candidate set for the terminal device is contained, and a mapping relationship between the one or more CCE sets and the control channel resource set.

Optionally, as shown in FIG. 4e, each of at least one control channel candidate element set includes a plurality of control channel candidates, and some control channel candidates of the plurality of control channel candidates belong to the control channel candidate set. To be specific, in the CCE set, one AL=8 control channel candidate #8-1, two AL=4 control channel candidates #4-1 and #4-2, two AL=2 control channel candidates #2-1 and #2-2, and four AL=1 control channel candidates #1-1 to #1-4 belong to the control channel candidate set corresponding to the terminal device. Other control channel candidates are not contained in the control channel candidate set corresponding to the terminal. It should be known that FIG. 4e is merely an example, and the terminal device may include different control channel candidates. Some control channel candidates are selected to belong to the control channel candidate set, to reduce a possibility of collision of control channels transmitted to different terminal devices. With a same quantity of blind detections, a plurality of CCE sets may be used with each CCE set containing a part of the control channel candidate set to reduce the possibility of collision of control channels transmitted to different terminal devices.

Optionally, a quantity of control channel candidates in the control channel candidate set is less than or equal to a maximum quantity of blind detections supported by the terminal device, and/or a quantity of control channel candidates of a first aggregation level in the control channel candidate set is less than or equal to a maximum quantity of blind detections supported by the terminal device with respect to the first aggregation level.

Figure 3B:
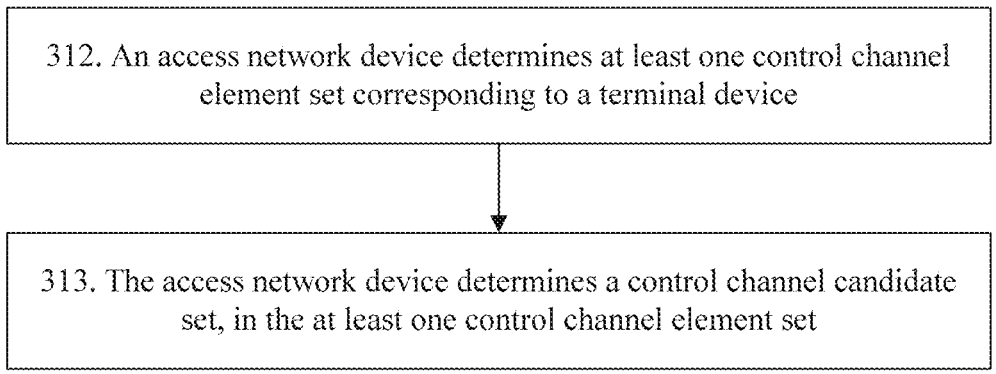
FIG. 3b is a schematic flowchart of one implementation of a control information sending method according to an embodiment of the present invention.

Optionally, in a possible embodiment, as shown in FIG. 3b, that an access network device determines a control channel candidate set corresponding to a terminal device in step 310 includes the following steps.

312: The access network device determines at least one control channel element set corresponding to the terminal device.

313: The access network device determines the control channel candidate set, in the at least one control channel element set.

Figure 3C:
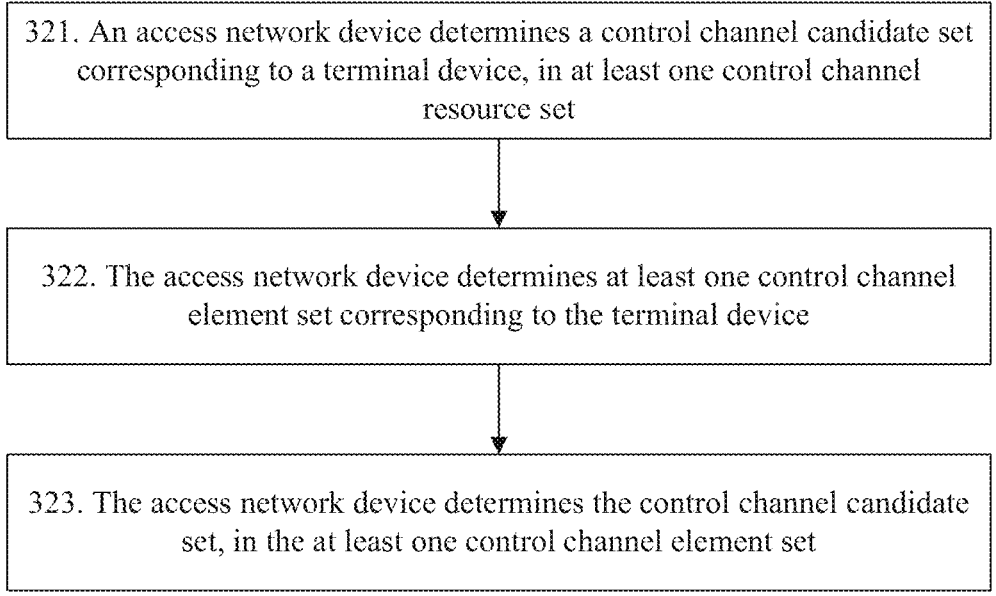
FIG. 3c is a schematic flowchart of another implementation of a control information sending method according to an embodiment of the present invention.

Optionally, in another possible embodiment, as shown in FIG. 3c, that an access network device determines a control channel candidate set corresponding to a terminal device in step 310 includes the following steps.

321: The terminal device determines the control channel candidate set corresponding to the terminal device, in at least one control channel resource set, where the at least one control channel resource set includes a plurality of control channel element sets.

322: The access network device determines at least one control channel element set corresponding to the terminal device.

323: The access network device determines the control channel candidate set, in the at least one control channel element set.

In step 312 and step 322, the access network device may determine the at least one control channel element set corresponding to the terminal device specifically in the following manners.

Manner 1: The access network device determines, based on one or more of identification information of the terminal device, a maximum aggregation level supported by the terminal device, slot information, control channel symbol number information, and a first offset, the at least one control channel element set corresponding to the terminal device; or the access network device determines, based on a random function with at least one variable, the at least one control channel element set corresponding to the terminal device, where the at least one variable includes at least one of identification information of the terminal device, a maximum aggregation level supported by the terminal device, slot information, and a first offset.

Figure 5:
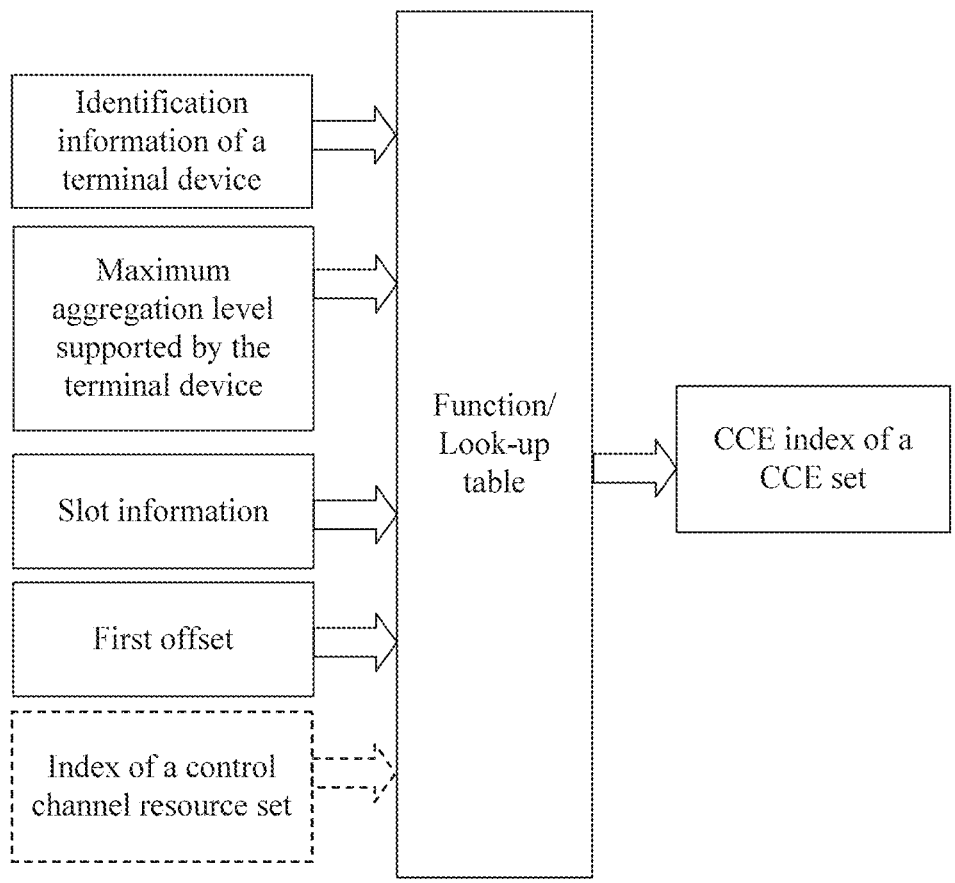
FIG. 5 is a schematic diagram of a logical structure of one implementation of determining a CCE set according to an embodiment of the present invention.

As shown in FIG. 5, the access network device may use a function or a look-up table, and use one or more of the identification information of the terminal device, the maximum aggregation level supported by the terminal device, the slot information, and the first offset as a variable(s) of the function or input of the look-up table, to obtain a CCE index(es), in one or more CCE sets corresponding to the terminal device, that represent the CCE set(s). A CCE index, in a CCE set, that represents the CCE set may be an index with a lowest or highest index value in the CCE set. For example, when the plurality of CCE sets are the consecutive CCE sets shown in FIG. 4f, CCE indexes CCE m, CCE m+8, and CCE m+16 representing the three CCE sets may be obtained, or only a CCE index CCE m representing the first CCE set may be obtained. For another example, when the plurality of CCE sets are the non-consecutive CCE sets shown in FIG. 4g, CCE indexes CCE m, CCE m+i, and CCE m+j representing the three CCE sets may be obtained, where i and j are the first offset. The first offset may be preset in the access network device and the terminal device, or may be configured by the access network device and notified to the terminal device through signaling.

The identification information of the terminal device may be temporary identification information allocated by the access network device for the terminal device. Using the identification information of the terminal device as input can make starting positions of search spaces of at least two terminal devices different. The slot information may be a lot number and/or a mini-slot number. Using the slot information of the terminal device as input can make starting positions of search spaces of the terminal device different in at least two different slots or mini-slots. The function may be a random function, such as a hash function.

Manner 2: The access network device determines, based on one or more of an index of the control channel resource set, identification information of the terminal device, a maximum aggregation level supported by the terminal device, symbol number information of the control channel resource set, slot information, and a first offset, the at least one control channel element set corresponding to the terminal device; or the access network device determines, based on a random function with at least one variable, the at least one control channel element set corresponding to the terminal device, where the at least one variable includes at least one of an index of the control channel resource set, identification information of the terminal device, a maximum aggregation level supported by the terminal device, slot information, and a first offset.

As shown in FIG. 5, when CCEs in a control channel are divided into a plurality of control channel resource sets, on a basis of manner 1, in manner 2, the index of the control channel resource set is further used as a variable of the function or input for the look-up table to obtain the CCE indexes, in various CCE sets corresponding to the terminal device, that represent the CCE sets.

In step 313 and step 323, the access network device determines the control channel candidate set, in the at least one control channel element set, specifically in the following manners.

Manner 1: The access network device determines, based on first configuration information, the control channel candidate set contained in the at least one control channel element set, where the first configuration information is notified to the terminal device in advance through higher layer signaling.

The first configuration information may be a second offset. For example, in an implementation, the first configuration information is a second offset k, where k=0 or k=1.

Manner 2: The access network device determines, based on identification information of the terminal device and/or a group identifier of a terminal device group to which the terminal device belongs, the control channel candidate set contained in the at least one control channel element set.

For example, the group identifier of the terminal device group to which the terminal device belongs is k, where k=0 or k=1.

For control channel candidates with the maximum aggregation level supported by the terminal device, for example, AL=8 shown in FIG. 4e, FIG. 4f, and FIG. 4g, the CCE indexes, in various CCE sets, that represent the CCE sets are indexes of the control channel candidates with AL=8.

For control channel candidates with AL=4, with FIG. 4e used as an example, when k=0, the control channel candidate is #4-1, and an index of the control channel candidate is CCE m; and when k=1, the control channel candidate is #4-2, and an index of the control channel candidate is CCE m+4.

For control channel candidates with AL=2, still with FIG. 4e used as an example, when k=0, the control channel candidates are #2-1 and #2-2, and indexes of the control channel candidates are CCE m and CCE m+4; and when k=1, the control channel candidates are #2-3 and #2-4, and indexes of the control channel candidates are CCE m+2 and CCE m+6.

For control channel candidates with AL=1, still with FIG. 4e used as an example, when k=0, the control channel candidates are #1-1, #1-2, #1-3, and #1-4, and indexes of the control channel candidates are CCE m+1, CCE m+3, CCE m+5, and CCE m+7; and when k=1, the control channel candidates are #1-5, #1-6, #1-7, and #1-8, and indexes of the control channel candidates are CCE m, CCE m+2, CCE m+4, and CCE m+6.

In the foregoing embodiment, when a control channel is divided into a plurality of control channel resource sets, and CCEs in each control channel resource set are separately numbered, a CCE index may not be able to uniquely determine a start position of a search space. Optionally, a combination of a control channel resource set index and a CCE index may be used to identify a CCE set and a control channel candidate in the foregoing embodiment.

Figure 6:
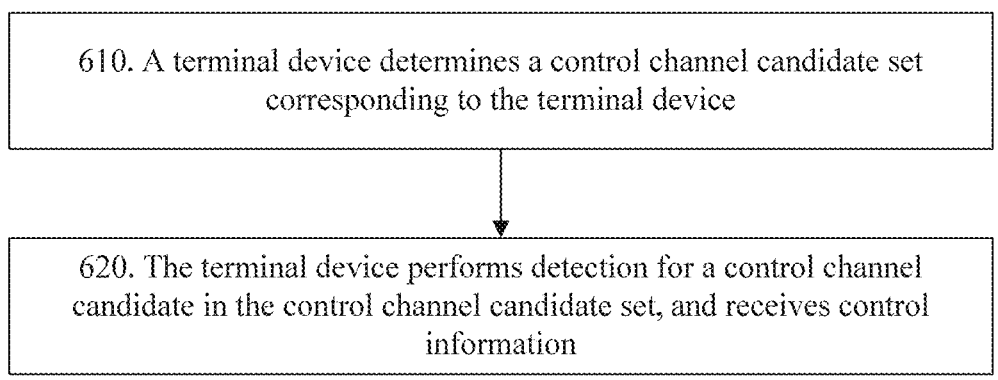
FIG. 6 is a schematic flowchart of a control information receiving method 600 according to an embodiment of the present invention.

FIG. 6 is a schematic flowchart of a control information receiving method 600 according to an embodiment of the present invention. As shown in FIG. 3a, the control information receiving method 600 is a method corresponding to the foregoing sending method. Therefore, the content described in the foregoing sending method also applies to the receiving method in this embodiment, and details are not described herein again. The method 600 includes the following content.

610: A terminal device determines a control channel candidate set corresponding to the terminal device.

Similar to the sending method in the foregoing embodiment, a control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device.

620: The terminal device performs detection for the control channel candidate in the control channel candidate set, and receives control information.

Optionally, each of at least one control channel candidate element set includes a plurality of control channel candidates, and some control channel candidates of the plurality of control channel candidates belong to the control channel candidate set.

Optionally, a quantity of control channel candidates in the control channel candidate set is less than or equal to a maximum quantity of blind detections supported by the terminal device, and/or a quantity of control channel candidates of a first aggregation level in the control channel candidate set is less than or equal to a maximum quantity of blind detections supported by the terminal device with respect to the first aggregation level.

Optionally, the method further includes: determining, by the terminal device, the control channel candidate set corresponding to the terminal device, in at least one control channel resource set, where the at least one control channel resource set includes a plurality of control channel element sets.

Optionally, the determining a control channel candidate set corresponding to the terminal device includes:
determining, by the terminal device based on one or more of identification information of the terminal device, the maximum aggregation level supported by the terminal device, slot information, and a first offset, the at least one control channel element set corresponding to the terminal device; or
determining, by the terminal device based on a random function with at least one variable, the at least one control channel element set corresponding to the terminal device, where the at least one variable includes at least one of identification information of the terminal device, the maximum aggregation level supported by the terminal device, slot information, and a first offset.

Alternatively, optionally, the determining a control channel candidate set corresponding to the terminal device includes:
determining, by the terminal device based on one or more of an index of the control channel resource set, identification information of the terminal device, the maximum aggregation level supported by the terminal device, slot information, and a first offset, the at least one control channel element set corresponding to the terminal device; or
determining, by the terminal device based on a random function with at least one variable, the at least one control channel element set corresponding to the terminal device, where the at least one variable includes at least one of an index of the control channel resource set, identification information of the terminal device, the maximum aggregation level supported by the terminal device, slot information, and a first offset.

Optionally, the determining a control channel candidate set corresponding to the terminal device further includes:
determining, by the terminal device based on first configuration information, the control channel candidate set contained in the at least one control channel element set, where the first configuration information is notified to the terminal device in advance through higher layer signaling; or
determining, by the terminal device based on the identification information of the terminal device and/or a group identifier of a terminal device group to which the terminal device belongs, the control channel candidate set contained in the at least one control channel element set.

Optionally, the maximum aggregation level supported by the terminal device is a maximum aggregation level that is allowed by a capability of the terminal device, or a maximum aggregation level configured by the access network device or the terminal device within a capability of the terminal device.

Figure 7:
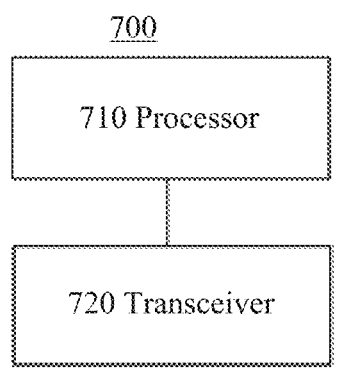
FIG. 7 is a schematic structural diagram of an access network device according to an embodiment of the present invention.

FIG. 7 is a schematic structural diagram of an access network device according to an embodiment of the present invention. The access network device 700 includes:
a processor 710, configured to determine a control channel candidate set corresponding to a terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device; and
a transceiver 720, configured for the access network device to send control information to the terminal device by using at least one control channel candidate in the control channel candidate set.

Optionally, each of at least one control channel candidate element set includes a plurality of control channel candidates, and some control channel candidates of the plurality of control channel candidates belong to the control channel candidate set.

Optionally, a quantity of control channel candidates contained in the control channel candidate set is less than or equal to a maximum quantity of blind detections supported by the terminal device; and/or
a quantity of control channel candidates of a first aggregation level in the control channel candidate set is less than or equal to a maximum quantity of blind detections supported by the terminal device with respect to the first aggregation level.

Optionally, the processor 710 is further configured to determine the control channel candidate set corresponding to the terminal device, in at least one control channel resource set, where the at least one control channel resource set includes a plurality of control channel element sets.

Optionally, that the processor 710 is configured to determine a control channel candidate set corresponding to a terminal device includes:
the processor 710 is configured to determine, based on one or more of identification information of the terminal device, the maximum aggregation level supported by the terminal device, slot information, and a first offset, the at least one control channel element set corresponding to the terminal device; or
the processor 710 is configured to determine, based on a random function with at least one variable, the at least one control channel element set corresponding to the terminal device, where the at least one variable includes at least one of identification information of the terminal device, the maximum aggregation level supported by the terminal device, slot information, and a first offset.

Optionally, that the processor 710 is configured to determine a control channel candidate set corresponding to a terminal device includes:
the processor 710 is configured to determine, based on one or more of an index of the control channel resource set, identification information of the terminal device, the maximum aggregation level supported by the terminal device, slot information, and a first offset, the at least one control channel element set corresponding to the terminal device; or
the processor 710 is configured to determine, based on a random function with at least one variable, the at least one control channel element set corresponding to the terminal device, where the at least one variable includes at least one of an index of the control channel resource set, identification information of the terminal device, the maximum aggregation level supported by the terminal device, slot information, and a first offset.

Optionally, the processor 710 is further configured to: determine, based on first configuration information, the control channel candidate set contained in the at least one control channel element set, where the first configuration information is notified to the terminal device in advance through higher layer signaling; or determine, based on the identification information of the terminal device and/or a group identifier of a terminal device group to which the terminal device belongs, the control channel candidate set contained in the at least one control channel element set.

Optionally, the maximum aggregation level supported by the terminal device is a maximum aggregation level that is allowed by a capability of the terminal device, or a maximum aggregation level configured by the access network device or the terminal device within a capability of the terminal device.

Figure 8:
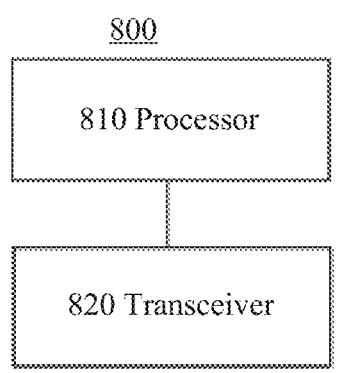
FIG. 8 is a schematic structural diagram of a terminal device according to an embodiment of the present invention.

FIG. 8 is a schematic structural diagram of a terminal device according to an embodiment of the present invention. The terminal device 800 includes:

- a processor 810, configured to determine a control channel candidate set corresponding to the terminal device, where the control channel candidate set includes at least one control channel candidate, the at least one control channel candidate includes at least one control channel element, the control channel candidate set is contained in at least one control channel element set, a quantity of control channel elements contained in the control channel element set is greater than or equal to a quantity of control channel elements corresponding to a maximum aggregation level supported by the terminal device, and the control channel candidates in the control channel element set that belong to the control channel candidate set have at least two aggregation levels, or have all aggregation levels within the maximum aggregation level supported by the terminal device; and
- a transceiver 820, configured to perform detection for the control channel candidate in the control channel candidate set, and receive control information.

Optionally, each of at least one control channel candidate element set includes a plurality of control channel candidates, and some control channel candidates of the plurality of control channel candidates belong to the control channel candidate set.

Optionally, a quantity of control channel candidates contained in the control channel candidate set is less than or equal to a maximum quantity of blind detections supported by the terminal device; and/or a quantity of control channel candidates of a first aggregation level in the control channel candidate set is less than or equal to a maximum quantity of blind detections supported by the terminal device with respect to the first aggregation level.

Optionally, the processor 810 is further configured to determine the control channel candidate set corresponding to the terminal device, in at least one control channel resource set, where the at least one control channel resource set includes a plurality of control channel element sets.

Optionally, that the processor 810 is configured to determine a control channel candidate set corresponding to the terminal device includes:

the processor 810 is configured to determine, based on one or more of identification information of the terminal device, the maximum aggregation level supported by the terminal device, slot information, and a first offset, the at least one control channel element set corresponding to the terminal device; or the processor 810 is configured to determine, based on a random function with at least one variable, the at least one control channel element set corresponding to the terminal device, where the at least one variable includes at least one of identification information of the terminal device, the maximum aggregation level supported by the terminal device, slot information, and a first offset.

Optionally, that the processor 810 is configured to determine a control channel candidate set corresponding to the terminal device includes:

the processor 810 is configured to determine, based on one or more of an index of the control channel resource set, identification information of the terminal device, the maximum aggregation level supported by the terminal device, slot information, and a first offset, the at least one control channel element set corresponding to the terminal device; or the processor 810 is configured to determine, based on a random function with at least one variable, the at least one control channel element set corresponding to the terminal device, where the at least one variable includes at least one of an index of the control channel resource set, identification information of the terminal device, the maximum aggregation level supported by the terminal device, slot information, and a first offset.

Optionally, the processor 810 is further configured to: determine, based on first configuration information, the control channel candidate set contained in the at least one control channel element set, where the first configuration information is notified to the terminal device in advance through higher layer signaling; or determine, based on the identification information of the terminal device and/or a group identifier of a terminal device group to which the terminal device belongs, the control channel candidate set contained in the at least one control channel element set.

Optionally, the maximum aggregation level supported by the terminal device is a maximum aggregation level that is allowed by a capability of the terminal device, or a maximum aggregation level configured by the access network device or the terminal device within a capability of the terminal device.

The memory in the foregoing embodiments may include a volatile memory, for example, a random-access memory (RAM). The memory may include a non-volatile memory such as a flash memory, a hard disk drive (HDD) or a solid-state drive (SSD). Alternatively, the memory may include a combination of the foregoing types of memories.

The processor in the foregoing embodiments may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, or unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may be not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control information receiving method, comprising:
   determining, by a terminal device, a control channel candidate set corresponding to the terminal device, wherein the control channel candidate set comprises at least one control channel candidate, the at least one control channel candidate comprises at least one control channel element, where control channel elements occupied by a control channel candidate with a maximum aggregation level supported by the terminal device is a control channel set, the control channel candidate set is contained in at least one control channel element set, a quantity of control channel elements contained in the control channel element set is greater than or equal to a quantity of control channel elements corresponding to the maximum aggregation level supported by the terminal device, and control channel candidates in the control channel element set that belong to the control channel candidate set have at least two aggregation levels, or have all aggregation levels within the maximum aggregation level supported by the terminal device; and
   performing, by the terminal device, detection for the control channel candidate in the control channel candidate set, and receiving control information;
   wherein each of the at least one control channel candidate element set comprises a plurality of control channel candidates, and a portion of the control channel candidates of the plurality of control channel candidates belong to the control channel candidate set while other control channel candidates of the plurality of control channel candidates are not contained in the control channel set.

2. The method according to claim 1, wherein
   a quantity of control channel candidates contained in the control channel candidate set is less than or equal to a maximum quantity of blind detections supported by the terminal device; and/or
   a quantity of control channel candidates of a first aggregation level in the control channel candidate set is less than or equal to a maximum quantity of blind detections supported by the terminal device with respect to the first aggregation level.

3. The method according to claim 1, further comprising:
   determining, by the terminal device, the control channel candidate set corresponding to the terminal device, in at least one control channel resource set, wherein the at least one control channel resource set comprises a plurality of control channel element sets.

4. The method according to claim 3, wherein the determining the control channel candidate set corresponding to the terminal device comprises:
   determining, by the terminal device based on one or more of identification information of the terminal device, the maximum aggregation level supported by the terminal device, slot information, and a first offset, the at least one control channel element set corresponding to the terminal device; or
   determining, by the terminal device based on a random function with at least one variable, the at least one control channel element set corresponding to the terminal device, wherein the at least one variable comprises at least one of identification information of the terminal device, the maximum aggregation level supported by the terminal device, slot information, and a first offset.

5. The method according to claim 3, wherein the determining the control channel candidate set corresponding to the terminal device comprises:
   determining, by the terminal device based on one or more of an index of the control channel resource set, identification information of the terminal device, the maximum aggregation level supported by the terminal device, slot information, and a first offset, the at least one control channel element set corresponding to the terminal device; or determining, by the terminal device based on a random function with at least one variable, the at least one control channel element set corresponding to the terminal device, wherein the at least one variable comprises at least one of an index of the control channel resource set, identification information of the terminal device, the maximum aggregation level supported by the terminal device, slot information, and a first offset.

6. The method according to claim 5, wherein the determining the control channel candidate set corresponding to the terminal device further comprises:
 determining, by the terminal device based on first configuration information, the control channel candidate set contained in the at least one control channel element set, wherein the first configuration information is notified to the terminal device in advance through higher layer signaling; or
 determining, by the terminal device based on the identification information of the terminal device and/or a group identifier of a terminal device group to which the terminal device belongs, the control channel candidate set contained in the at least one control channel element set.

7. The method according to 1, wherein the maximum aggregation level supported by the terminal device is a maximum aggregation level that is allowed by a capability of the terminal device, or a maximum aggregation level configured by an access network device or the terminal device within a capability of the terminal device.

8. A terminal device, comprising:
 a processor configured to determine a control channel candidate set corresponding to the terminal device, wherein the control channel candidate set comprises at least one control channel candidate, the at least one control channel candidate comprises at least one control channel element, where control channel elements occupied by a control channel candidate with a maximum aggregation level supported by the terminal device is a control channel set, the control channel candidate set is contained in at least one control channel element set, a quantity of control channel elements contained in the control channel element set is greater than or equal to a quantity of control channel elements corresponding to the maximum aggregation level supported by the terminal device, and control channel candidates in the control channel element set that belong to the control channel candidate set have at least two aggregation levels, or have all aggregation levels within the maximum aggregation level supported by the terminal device; and
 a transceiver configured to perform detection for the control channel candidate in the control channel candidate set, and receive control information;
 wherein each of the at least one control channel candidate element set comprises a plurality of control channel candidates, and a portion of the control channel candidates of the plurality of control channel candidates belong to the control channel candidate set while other control channel candidates of the plurality of control channel candidates are not contained in the control channel set.

9. The terminal device according to claim 8, wherein
 a quantity of control channel candidates contained in the control channel candidate set is less than or equal to a maximum quantity of blind detections supported by the terminal device; and/or
 a quantity of control channel candidates of a first aggregation level in the control channel candidate set is less than or equal to a maximum quantity of blind detections supported by the terminal device with respect to the first aggregation level.

10. The terminal device according to claim 8, wherein the processor is further configured to determine the control channel candidate set corresponding to the terminal device, in at least one control channel resource set, wherein the at least one control channel resource set comprises a plurality of control channel element sets.

11. The terminal device according to claim 10, wherein that the processor is configured to determine the control channel candidate set corresponding to the terminal device comprises:
 the processor is configured to determine, based on one or more of identification information of the terminal device, the maximum aggregation level supported by the terminal device, slot information, and a first offset, the at least one control channel element set corresponding to the terminal device; or
 the processor is configured to determine, based on a random function with at least one variable, the at least one control channel element set corresponding to the terminal device, wherein the at least one variable comprises at least one of identification information of the terminal device, the maximum aggregation level supported by the terminal device, slot information, and a first offset.

12. The terminal device according to claim 10, wherein that the processor is configured to determine the control channel candidate set corresponding to the terminal device comprises:
 the processor is configured to determine, based on one or more of an index of the control channel resource set, identification information of the terminal device, the maximum aggregation level supported by the terminal device, slot information, and a first offset, the at least one control channel element set corresponding to the terminal device; or
 the processor is configured to determine, based on a random function with at least one variable, the at least one control channel element set corresponding to the terminal device, wherein the at least one variable comprises at least one of an index of the control channel resource set, identification information of the terminal device, the maximum aggregation level supported by the terminal device, slot information, and a first offset.

13. The terminal device according to claim 12, wherein the processor is further configured to:
 determine, based on first configuration information, the control channel candidate set contained in the at least one control channel element set, wherein the first configuration information is notified to the terminal device in advance through higher layer signaling; or
 determine, based on the identification information of the terminal device and/or a group identifier of a terminal device group to which the terminal device belongs, the control channel candidate set contained in the at least one control channel element set.

14. The terminal device according to claim 8, wherein the maximum aggregation level supported by the terminal device is a maximum aggregation level that is allowed by a capability of the terminal device, or a maximum aggregation level configured by an access network device or the terminal device within a capability of the terminal device.

15. A non-transitory computer readable storage medium, comprising an instruction, wherein when the instruction runs on a computer, the computer performs a control information receiving method by performing operations, comprising:
- determining a control channel candidate set corresponding to a terminal device, wherein the control channel candidate set comprises at least one control channel candidate, the at least one control channel candidate comprises at least one control channel element, where control channel elements occupied by a control channel candidate with a maximum aggregation level supported by the terminal device is a control channel set, the control channel candidate set is contained in at least one control channel element set, a quantity of control channel elements contained in the control channel element set is greater than or equal to a quantity of control channel elements corresponding to the maximum aggregation level supported by the terminal device, and control channel candidates in the control channel element set that belong to the control channel candidate set have at least two aggregation levels, or have all aggregation levels within the maximum aggregation level supported by the terminal device; and
- performing detection for the control channel candidate in the control channel candidate set, and receiving control information;
- wherein each of the at least one control channel candidate element set comprises a plurality of control channel candidates, and a portion of the control channel candidates of the plurality of control channel candidates belong to the control channel candidate set while other control channel candidates of the plurality of control channel candidates are not contained in the control channel set.

16. The non-transitory computer readable storage medium according to claim 15, wherein
- a quantity of control channel candidates contained in the control channel candidate set is less than or equal to a maximum quantity of blind detections supported by the terminal device; and/or
- a quantity of control channel candidates of a first aggregation level in the control channel candidate set is less than or equal to a maximum quantity of blind detections supported by the terminal device with respect to the first aggregation level.

17. The non-transitory computer readable storage medium according to claim 15, further comprising:
- determining, by the terminal device, the control channel candidate set corresponding to the terminal device, in at least one control channel resource set, wherein the at least one control channel resource set comprises a plurality of control channel element sets.

* * * * *